T. K. ENGER.
ELECTRIC METAL WORKING APPARATUS.
APPLICATION FILED APR. 6, 1920.

1,358,428.

Patented Nov. 9, 1920.
2 SHEETS—SHEET 2.

Thorbjorn K. Enger, Inventor
By his Attorneys
Townsend & Decker

UNITED STATES PATENT OFFICE.

THORBJØRN KJUS ENGER, OF LEIRSUND STA., CHRISTIANIA, NORWAY, ASSIGNOR TO THOMSON ELECTRIC WELDING COMPANY, OF BOSTON, MASSACHUSETTS, A CORPORATION OF MASSACHUSETTS.

ELECTRIC METAL-WORKING APPARATUS.

1,358,428.  Specification of Letters Patent.  Patented Nov. 9, 1920.

Application filed April 6, 1920. Serial No. 371,639.

*To all whom it may concern:*

Be it known that I, THORBJØRN K. ENGER, subject of Norway, and temporary residence Leirsund Sta., Christiania, Norway, have invented certain new and useful Improvements in Electric Metal-Working Apparatus, of which the following is a specification.

My invention relates to that class of electric metal working apparatus in which a transformer operated by alternating current is employed to deliver, by its secondary, a current of large volume but low voltage as compared with the primary for heating the work, as for instance in the operation of electric welding, bending, forging, brazing, riveting, annealing or other metal working operation as commonly conducted by the use of an electric current caused to traverse the section of work to be heated.

Owing to the small voltage and large volume of current on the secondary of a transformer organized for this class of work, a large inductive reactance is introduced which causes the current in the primary circuit to lag excessively behind the voltage applied to the primary so that the machine has a very low power factor,—in practice rarely above fifty per cent.

The object of the present invention is to better the power factor, lower the cost of operation and generally increase the efficiency of the machine by utilizing a condenser, preferably of the static type, in such a way as to neutralize the inductive reactance of the transformer and thereby obtaining a current which will more nearly be in phase with the applied voltage of the primary.

A further object of my invention is to secure a sufficient operating voltage for a static condenser when such is employed in this manner.

Figure 1:
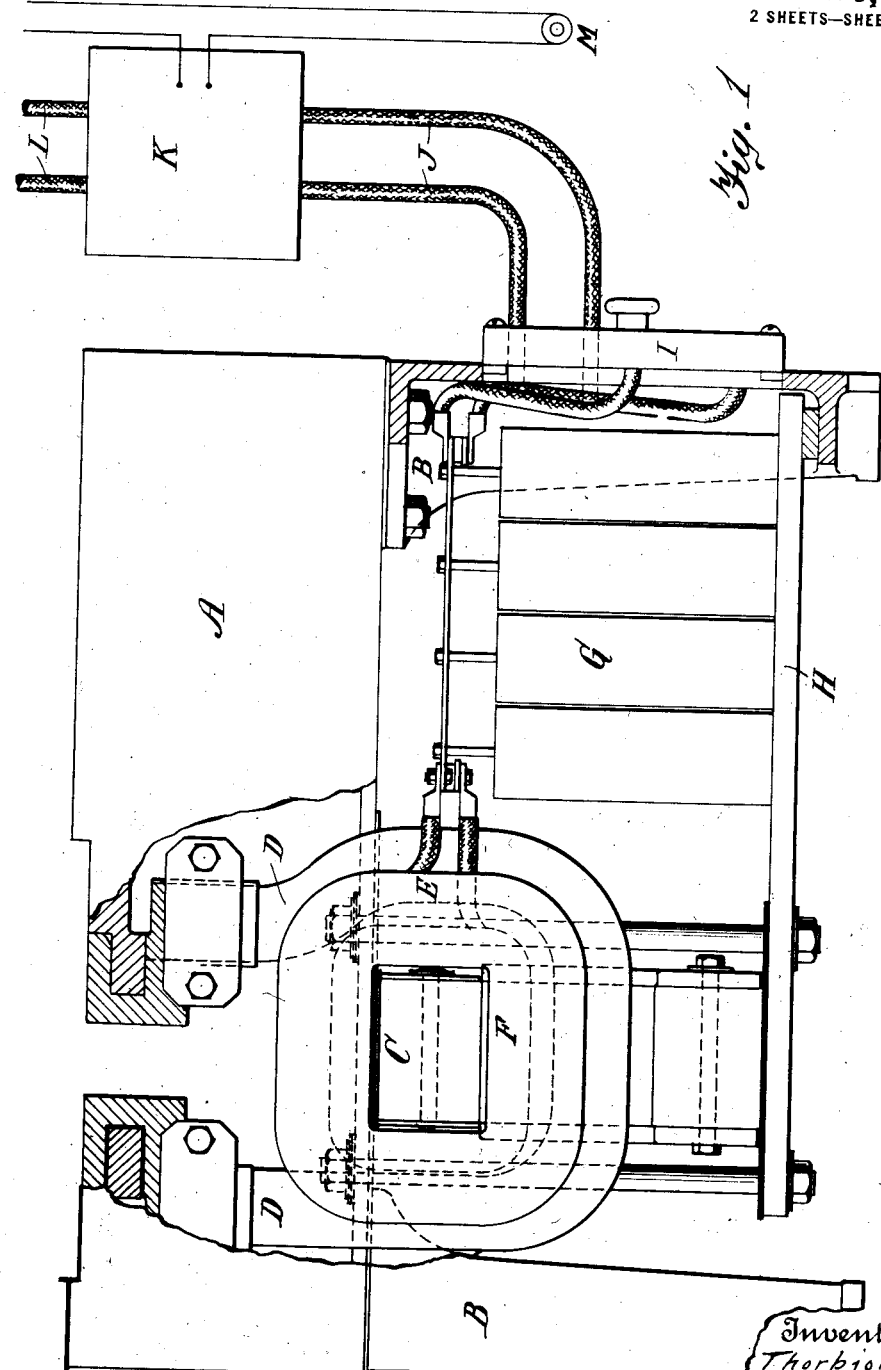
Figure 1 is a side elevation of a transformer having a single-turn secondary and provided with a condenser employed according to my invention.
Figure 2:
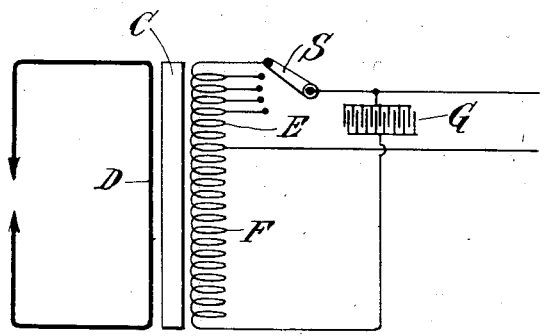
Fig. 2 is a diagram of circuits of the apparatus.

A indicates the frame of the machine, B B legs or supports therefor, C the core of the transformer and D the one-turn low-voltage secondary. E indicates the primary and G a static condenser connected across the mains supplying the primary and in series with an auxiliary winding F connected in series with the main primary winding as shown more particularly in the diagram Fig. 2. Other parts indicated in Fig. 1 and which may be of the ordinary construction, are the support for the static condenser indicated at H, a regulating switch I, lead cables J, contactor panel K, main line L and push button switch M for closing the circuit that actuates the contactor panel.

As the most efficient operating voltage for the static condenser is found to be much higher than that of the primary winding of the welder which in practice may be either 110, 220, 330, 440, or 550 volts or some odd voltage between any two of them, the auxiliary coil is employed as a booster coil to step up the voltage of the condenser to its effective value. Said auxiliary or booster coil, as described, preferably utilizes the main transformer core instead of a separate transformer core, the whole primary winding being then in effect the primary of the altered transformer and the auxiliary winding being of sufficient turns to make up, when operated in series with the primary, the voltage desired as the effective value of the volts for the condenser.

Figure 3:
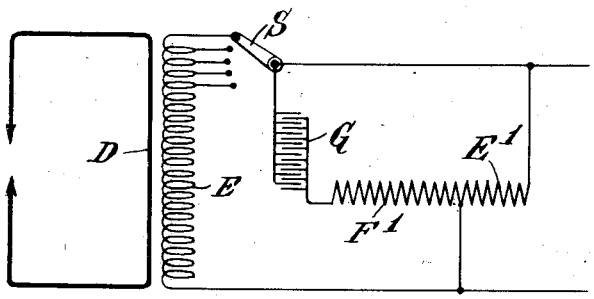
Fig. 3 shows diagrammatically a modification in the manner of applying the condenser and securing efficient operating voltage for the same.

When the invention is applied, however, to an old welding machine, it can be installed separately and a separate auto-transformer stepping up the voltage may be used, as indicated in the diagram Fig. 3, wherein the auto-transformer is applied as a separate device across the lines and in a manner to step up the voltage for the condenser.

Obviously by inserting enough capacity reactance by means of the condenser to overcome the inductive reactance of the apparatus resulting from the construction of the secondary for low voltage heavy currents, an approach to a unity power factor can be obtained and the general efficiency of the heater greatly increased,—say from thirty to fifty per cent. depending upon the amount of power factor correction to be made. Hence a given welder may be made to handle work from thirty to fifty per cent. greater in cross-section or for a given size of work a machine from thirty to fifty per cent. smaller can be used.

Furthermore, by the use of my invention, surges on the feeder line may be greatly reduced thus minimizing the fluctuations of the line voltage and its disturbing influence on other apparatus on the line. Recording instruments in the power house will show a smoother curve and the power house operator is able to take on an additional load on a feeder operating the machine, thus increasing his income.

What I claim as my invention is:—

1. The combination of an electric transformer constructed to supply heavy current of low voltage for heating purposes and a condenser connected to said transformer to neutralize the inductive reactance thereof.

2. The combination of an electric transformer constructed to supply heavy current of low voltage for heating purposes and a static condenser connected to said transformer to neutralize the inductive reactance thereof and a booster coil connected into the circuit of said condenser.

3. The combination with a transformer having a secondary adapted to supply current of low voltage and large volume for heating purposes, of a condenser connected to the transformer and an auxiliary coil wound upon the transformer core in series with the primary and adapted to increase the voltage of the condenser.

4. The combination with a transformer supplying from its secondary current of large volume and low voltage and a condenser connected to said transformer through a coil operating after the manner of a booster coil in an auto-transformer.

5. The combination of an electric transformer constructed to supply heavy current of low voltage for heating purposes, a static condenser connected to said transformer to neutralize the inductive reactance thereof and a coil wound on the transformer and connected to the condenser.

6. In an electric metal working transformer, the combination of a core, a secondary on said core for supplying heating current, a primary on said core the terminals of which are connected to a condenser and tapped connections on said primary connected to the energizing current.

Signed at Christiania, Kingdom of Norway, this 30th day of January, A. D. 1920.

THORBJØRN KJUS ENGER.

Witnesses:
NORTH A. HEDENSCHON,
ROBERT H. FRAZIER.